Jan. 29, 1952        H. J. TAPLIN        2,583,717

MEANS FOR DETERMINING THE TIME OF RUN OF POWER-DRIVEN MODELS

Filed March 21, 1950

INVENTOR

HAROLD JOHN TAPLIN by Walter S. Pherton

ATTORNEY

Patented Jan. 29, 1952

2,583,717

UNITED STATES PATENT OFFICE 2,583,717

MEANS FOR DETERMINING THE TIME OF RUN OF POWER-DRIVEN MODELS

Harold John Taplin, Birchington, England

Application March 21, 1950, Serial No. 150,830
In Great Britain March 22, 1949

3 Claims. (Cl. 161—1)

1

This invention relates to new or improved means for determining the time of run of power-driven models such as model aircraft or boats.

Model aircraft nowadays are commonly powered by small petrol or compression-ignition engines, and as their speed is high it is desirable to provide some means for limiting the time of flight so that if an aircraft is flown in free flight it does not fly far enough for there to be a risk of it being lost.

One method of limiting the time of flight is to provide only a measured quantity of fuel so that the engine stops when the fuel is used up but this method is not satisfactory in practice and is very inaccurate.

Another method is to stop the engine by means of an adjustable pneumatic timer comprising a spring-loaded dashpot, but such timers are not satisfactory because the time taken for the return movement of the piston varies with temperature and with the amount of lubricant on the piston, and there is always a risk of the piston sticking and failing to stop the engine.

According to my invention means for determining the time of run of power-driven models comprises a spring-driven clockwork train mounted in a suitable casing, the spindle of the final or high-speed pinion carrying a vane, eccentric weight, or other means for controlling its speed of rotation and the first or slow speed spindle carrying a cam, arm, or other means which, when the spring has been unwound to a predetermined extent, engages a linearly movable bar or rod coupled to means for stopping the engine of the model.

This bar or rod may for example be arranged to operate a switch or cut-out in the ignition circuit of a petrol engine or to close the throttle of a compression-ignition engine.

Thus the stopping of the engine takes place substantially instantaneously and the time of flight of a model aircraft can be accurately determined.

The clockwork train may conveniently be designed to run for 60 seconds for a complete revolution of the first or slow speed spindle from the fully wound position of the spring as that is the usual maximum time for a free flight by a model aircraft, and by winding the spring up to a lesser extent the time of flight will be correspondingly reduced.

One practical timing mechanism in accordance with our invention is illustrated by way of example in the accompanying drawings in which:

Figure 1 is a front elevation of the complete

2 unit showing the operative parts in their normal rest positions.

Figure 1:
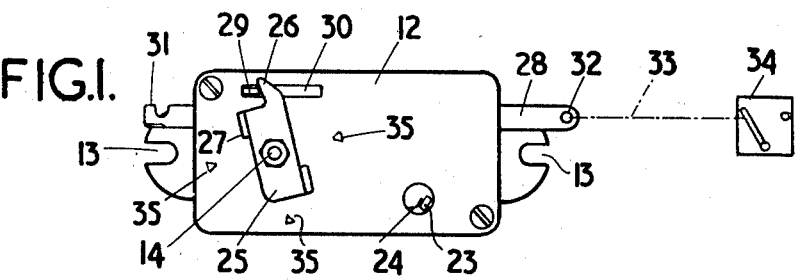
Figure 2:
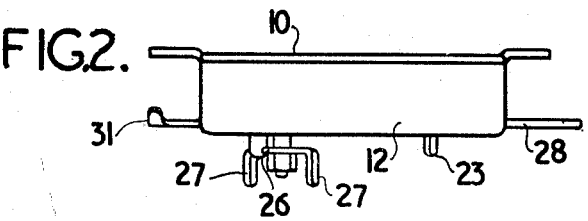
Figure 2 is a plan.

The timing mechanism illustrated consists essentially of a clockwork train mounted between two frame plates 10, 11 and enclosed in a pressed sheet metal cover 12, these parts preferably being made of aluminium or light alloy. The rear frame plate 10 is extended at each end and slotted as shown at 13 to receive screws or the like for mounting the mechanism in a model.

The first or slow-speed spindle 14 of the clockwork train carries the spring 15 and a toothed wheel 16 which is coupled through multiplying gearing 17, 18, 19 to a high-speed spindle 20. The spindle 20 carries a vane or an eccentric weight 21 which controls its speed of rotation and which is adapted to be engaged by a projection on a stop lever 22 actuated by a finger-piece 23 projecting through an opening 24 in the cover.

The spindle 14 also projects through an opening in the cover and has keyed on it a winder plate 25 having on one end a projecting finger 26. The plate also has two opposed cranked lugs 27 for engagement by the fingers to rotate the spindle and wind up the spring.

A flat bar 28 is slidably mounted in the cover between the front of the cover and the frame plate 11, the bar being guided in slots in the end walls of the cover for rectilinear movement. At one point in its length the bar carries a cranked lug 29 which projects through a slot 30 in the cover into the path of the finger 26 on the winder plate.

One end of the bar is formed with a hook or lug 31 for engagement by the fingers and the other end is formed with an eye 32 for connecting the bar to the means for stopping the engine. In Figure 1 the bar is shown connected by a cord or wire 33 to a switch indicated at 34.

Figure 3:
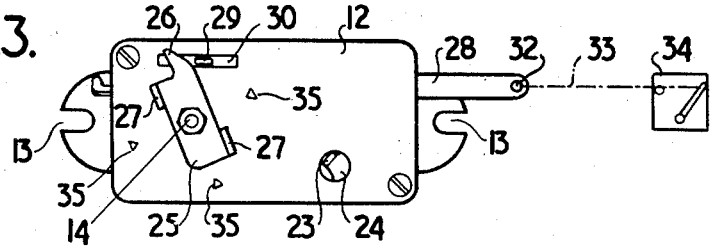
Figure 3 is an elevation similar to Figure 1 showing the mechanism wound up ready for use.
Figure 4:
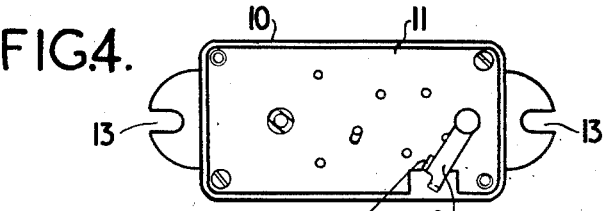
Figure 4 is an elevation of the mechanism with the cover removed.
Figure 5:
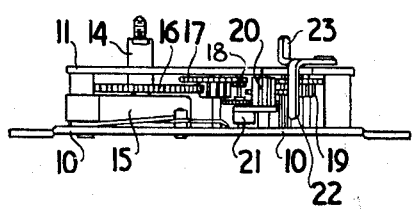
Figure 5 is an inverted plan of the mechanism.
Figure 6:
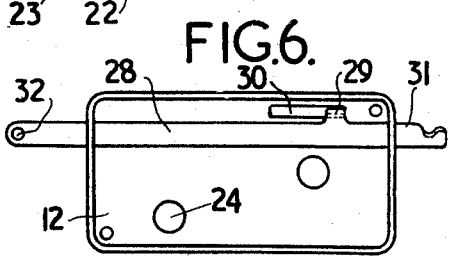
Figure 6 is an elevation of the cover from the inside.

In the normal out-of-use position of the mechanism the finger 26 engages the lug 29 on the bar 28 and holds it at one end of the slot 30. To set the mechanism the stop lever 22 is moved over to engage the high-speed spindle and hold it against movement and the winder plate 25 is turned in a clockwise direction through one revolution to wind up the spring. As the winder plate is completing its revolution the finger 26 engages the opposite side of the lug 29 and moves the bar 28 to the right to allow the switch 34 to be closed. Alternatively the bar may be moved manually before the spring is wound up. The parts are then in the position shown in Figure 3.

When the mechanism is set in motion by moving the stop lever 22 clear of the high-speed spindle the spring unwinds and the spindle 14 rotates in an anti-clockwise direction at a speed controlled by the vane, weight or the like on the high-speed spindle. The winder plate moves with the spindle and as it is approaching the end of its revolution the finger 26 again engages the lug 29 and moves the bar 28 to the left to operate the switch 34 and stop the engine.

As the spring 15 is only unwound one turn it is always working close to its maximum power and the speed of rotation of the spindle 14 will not vary appreciably.

Preferably the clockwork train is arranged to unwind at such a speed that it takes 60 seconds for the spindle 14 to complete a revolution so that the engine will be stopped 60 seconds after the mechanism has been started.

If a shorter run is required the spring can be wound through less than a full revolution and markings such as those indicated at 35 in Figure 1 may be provided on the cover to show the angle through which the finger 26 should be turned to give runs of 15, 30 and 45 seconds. The stop lever 22 will usually be operated manually but means may be provided for operating the lever automatically as the model starts its run.

I claim:

1. In a timing mechanism driven by a spring urged controlled speed clockwork train for controlling the time of run of a power driven model; a casing enclosing said train, and means adapted to stop the train after a predetermined period of time, said means including a bar mounted in the casing for linear movement and adapted to be coupled to means stopping the power unit of the model, a fixed stop on said casing, and a finger on the winding spindle of the clockwork train adapted to engage said bar and move it linearly into engagement with said stop when the spindle has turned through a predetermined angle.

2. In a timing mechanism driven by a spring urged controlled speed clockwork train for controlling the time of run of a power driven model; a casing enclosing said train, a manually operated winding member on the spindle of the clockwork train, and means adapted to stop the train after a predetermined period of time, said means including a bar slidably mounted for linear movement in the casing and adapted to be connected to means for stopping the power unit of the model, a projecting finger on the winding member, and a lug on the bar extending into the path of the finger on the winding member and adapted to be engaged by said finger to move the bar in one direction when the winding member has been turned through a predetermined angle in winding up the spring and to move the bar in the opposite direction and stop the power unit when the winding member has been returned through the same angle by the unwinding of the spring.

3. In a timing mechanism driven by a spring urged clockwork train for controlling the time of run of a power driven model, a casing enclosing said train, a manually operated winding spindle projecting from the casing and constituting the slow speed spindle of the train, a high speed spindle of the strain having means mounted on the spindle for controlling its speed of rotation, a lever mounted on the casing and adapted to enter into engagement with said means to hold the clockwork train stationary during winding and until the model is started, a bar mounted in the casing for linear movement and adapted to be coupled to means for stopping the power unit of the model, and a finger on the winding spindle adapted to engage said bar and move it linearly to stop the power unit when the winding spindle has been turned through a predetermined angle by the unwinding of the spring.

HAROLD JOHN TAPLIN.

REFERENCES CITED

The following references are of record in the file of this patent:

UNITED STATES PATENTS

| Number | Name | Date |
| --- | --- | --- |
| 2,339,497 | Maheras | Jan. 18, 1944 |